US009620747B2

(12) United States Patent
Kim et al.

(10) Patent No.: US 9,620,747 B2
(45) Date of Patent: Apr. 11, 2017

(54) SECONDARY BATTERY

(71) Applicant: SAMSUNG SDI CO., LTD., Yongin-si, Gyeonggi-do (KR)

(72) Inventors: Dukjung Kim, Yongin-si (KR); Taeahn Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 77 days.

(21) Appl. No.: 14/580,947

(22) Filed: Dec. 23, 2014

(65) Prior Publication Data
US 2015/0295211 A1    Oct. 15, 2015

(30) Foreign Application Priority Data

Apr. 11, 2014 (KR) .................. 10-2014-0043746

(51) Int. Cl.
| | | |
|---|---|---|
| *H01M 2/08* | (2006.01) | |
| *H01M 2/02* | (2006.01) | |
| *H01M 10/0525* | (2010.01) | |
| *H01M 2/30* | (2006.01) | |
| *H01M 2/12* | (2006.01) | |
| *H01M 2/06* | (2006.01) | |

(52) U.S. Cl.
CPC .............. *H01M 2/08* (2013.01); *H01M 2/06* (2013.01); *H01M 2/1264* (2013.01); *H01M 2/30* (2013.01); *H01M 2/0202* (2013.01); *H01M 2/0237* (2013.01); *H01M 10/0525* (2013.01); *H01M 2220/20* (2013.01); *H01M 2220/30* (2013.01); *Y02T 10/7011* (2013.01)

(58) Field of Classification Search
CPC ...... H01M 2/08; H01M 2/02; H01M 10/0525; H01M 2/06; H01M 2/1264; H01M 2/30
See application file for complete search history.

(56) References Cited

U.S. PATENT DOCUMENTS

| | | | | |
|---|---|---|---|---|
| 5,598,082 | A * | 1/1997 | Gilpin ................ | G06K 7/10881 200/293.1 |
| 2002/0011711 | A1* | 1/2002 | Senda ....................... | H01G 9/10 277/626 |
| 2006/0216578 | A1* | 9/2006 | Kwon ................. | H01M 2/0473 429/56 |
| 2010/0141214 | A1* | 6/2010 | Yoon ....................... | B60K 6/28 320/134 |
| 2013/0004832 | A1* | 1/2013 | Kim ........................ | H01M 2/30 429/179 |

FOREIGN PATENT DOCUMENTS

| | | |
|---|---|---|
| JP | H07142081 A | 6/1995 |
| JP | 08-138166 | 5/1996 |
| JP | 2005-038707 | 2/2005 |
| KR | 10-2002-0031771 A | 5/2002 |

* cited by examiner

*Primary Examiner* — Miriam Stagg
*Assistant Examiner* — Seenam Agbetiafan
(74) *Attorney, Agent, or Firm* — Lee & Morse P.C.

(57) ABSTRACT

A secondary battery includes a case including an accommodating space therein, an electrode assembly in the accommodating space of the case, a collecting plate electrically connected to the electrode assembly, a cap plate sealing the case, the collecting plate passing through the cap plate, a terminal plate coupled to an exposed end of the collecting plate, and an insulation member between the cap plate and the terminal plate, the insulation member including a sealing member on at least one surface thereof.

12 Claims, 8 Drawing Sheets

SECONDARY BATTERY

CROSS-REFERENCE TO RELATED APPLICATION

Korean Patent Application No. 10-2014-0043746, filed on Apr. 11, 2014, in the Korean Intellectual Property Office, and entitled: "Secondary Battery," is incorporated by reference herein in its entirety.

BACKGROUND

1. Field

Embodiments relate to a secondary battery.

2. Description of the Related Art

Generally, secondary batteries can be discharged and recharged, unlike primary batteries, which are not rechargeable. Secondary batteries may be of a low capacity type, which includes battery cells in the form of a pack typically used for small portable electronic devices such as cellular phones and camcorders, or a high capacity type, which includes several battery cells connected to one another to be used as a motor-driving power source for electric scooters, hybrid vehicles, electric vehicles, etc.

Secondary batteries may be manufactured in various shapes, such as cylindrical shape or prismatic shapes. A typical secondary battery may include an electrode assembly having a positive plate and a negative plate with a separator acting as an insulator between the positive and negative plates accommodated in a battery case with an electrolyte, and a cap assembly having electrode terminals coupled to the case. The electrode assembly may be connected to positive and negative terminals which protrude from the cap plate and may be exposed to the exterior of the secondary battery.

SUMMARY

Embodiments are directed to a secondary battery, including a case including an accommodating space therein, an electrode assembly in the accommodating space of the case, a collecting plate electrically connected to the electrode assembly, a cap plate sealing the case, the collecting plate passing through the cap plate, a terminal plate coupled to an exposed end of the collecting plate, and an insulation member between the cap plate and the terminal plate, the insulation member including a sealing member on at least one surface thereof.

The sealing member may be in a form of an O-ring located along a periphery of the exposed end of the collecting plate.

The insulation member may include a penetration hole through which the collecting plate passes. The sealing member may surround the periphery of the penetration hole.

The sealing member may be continuously formed along the periphery of the penetration hole.

The insulation member may include a sealing groove at a region corresponding to the sealing member, the sealing groove accommodating the sealing member.

The sealing member may be adhered to the insulation member by an adhesion member and presses the cap plate and the terminal plate.

The sealing member may include at least one selected from the group of foamed sponge, ethylene propylene diene rubber, acrylic rubber, silicone rubber, an elastomer, a thermoplastic elastomer, a thermoplastic urethane, a rubber-like material, and a polymer plastic.

The sealing member may protrude relative to the insulation member in a state prior to the cap plate and terminal plate being coupled to each other, and may be compressively transformed in a state that the cap plate and the terminal plate are coupled thereto.

The sealing member may be on a surface on which the insulation member makes contact with the cap plate. The insulation member further includes a ventilation groove on the surface.

One end of the ventilation groove may be positioned within the periphery of the sealing member. Another end of the ventilation groove may extend to the exterior of the periphery of the sealing member.

The other end of the ventilation groove may extend to an exterior edge of the insulation member.

The sealing member may be a foamed sponge.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
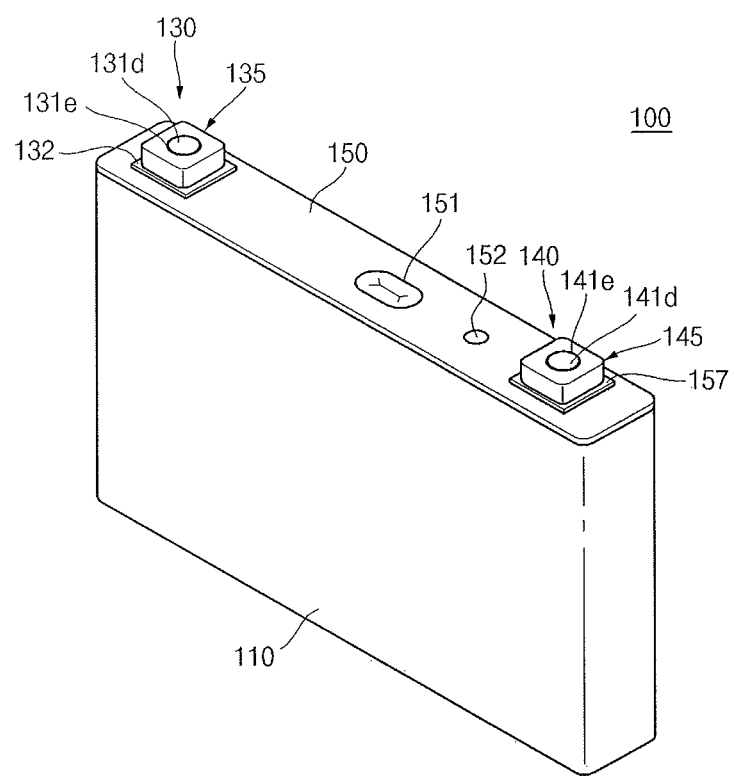
FIG. 1 illustrates a perspective view depicting a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Hereinafter, a configuration of a secondary battery according to an embodiment will be described.

Figure 2:
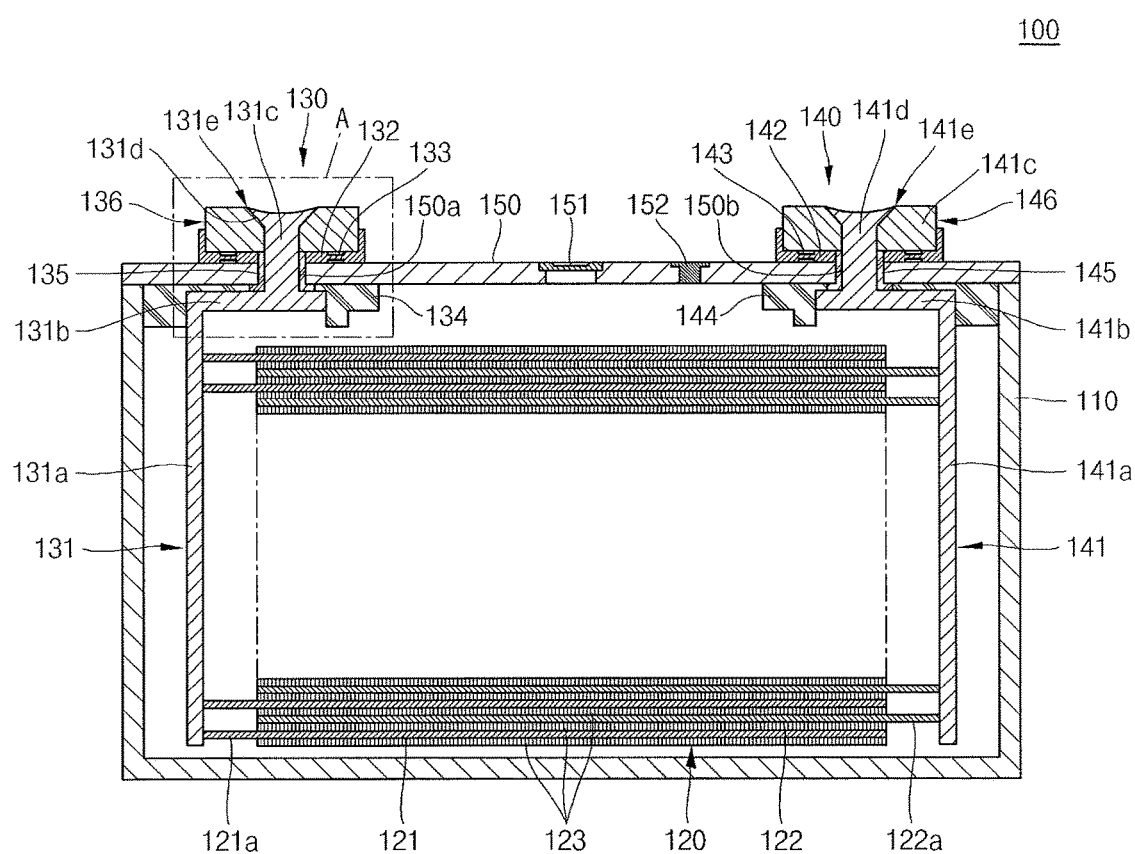
FIG. 2 illustrates a sectional view of the secondary battery shown in FIG. 1.
Figure 3:
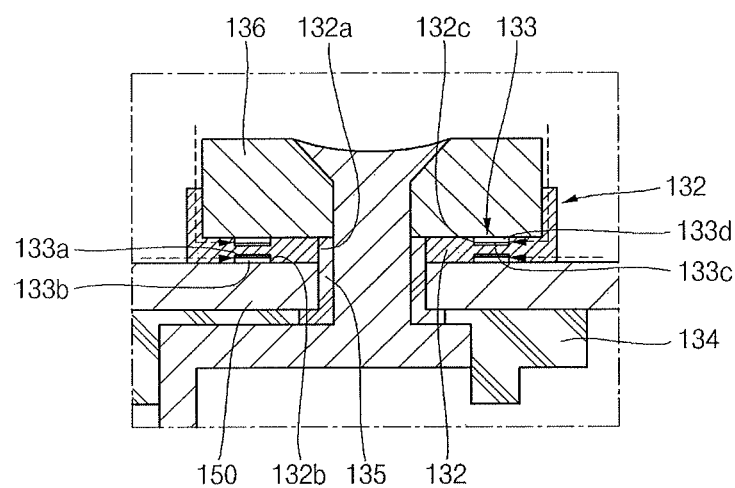
FIG. 3 illustrates an enlarged cross-sectional view depicting a portion 'A' of FIG. 2.

FIG. 1 illustrates a perspective view depicting a secondary battery according to an embodiment, FIG. 2 illustrates a sectional view of the secondary battery shown in FIG. 1, and FIG. 3 illustrates an enlarged cross-sectional view depicting a portion 'A' of FIG. 2.

Referring to FIGS. 1 to 3, the secondary battery 100 according to an embodiment may include a case 110, an electrode assembly 120, a first terminal assembly 130, a second terminal assembly 140, and a cap plate 150.

The case 110 may be made of conductive metal, for example, aluminum, aluminum alloy, or nickel and may have an approximately hexahedron shape with an opening such that the electrode assembly 110 may be inserted and placed in the case 110. FIG. 2 illustrates a state in which the case 110 and the cap assembly 150 are coupled to each other, with the peripheral part of the cap assembly 150 substantially corresponding to the opening of the case 110.

The case 110 may be electrically isolated from the first terminal assembly 130 and the second terminal assembly 140 through an insulation member. In addition, the inner surface of the case 110 may be basically insulated, such that the case 110 is electrically isolated from the terminal assembly 130, 140 even if the case 110 is brought into contact with the terminal assembly 130, 140 due to movement of an uncoated portion of the electrode assembly 110. It may be possible to prevent an electric short from occurring under normal conditions. In some implementations, the case 110 may be electrically connected to one of the terminal assemblies 130 and 140 to have the same polarity with a connected one of the terminal assemblies 130 and 140.

The electrode assembly 120 may be formed by winding or laminating a stacked structure including a first electrode plate 121, a separator 123, and a second electrode plate 122, which may be shaped as a thin plate or a thin foil. The first electrode plate 121 may function as a positive electrode, and the second electrode plate 122 may function as a negative electrode. In other implementations, the first electrode plate 121 and the second electrode plate 122 may function oppositely such that the polarities of the first and second electrode plates 121 and 122 may be reversed.

The first electrode plate 121 may be formed by applying a first electrode active material such as a transition metal oxide to a first electrode collecting plate formed of metal foil such as aluminum foil. The first electrode plate 121 may include a first electrode uncoated portion 121a to which the first electrode active metal is not applied. The first electrode uncoated portion 121a may function as a current flow passageway between the first electrode plate 121 and the outside of the first electrode plate 121. A suitable material may be used to form the first electrode plate 121.

The second electrode plate 122 may be formed by applying a second electrode active material such as graphite or carbon to a second electrode collecting plate formed of metal foil such as copper or nickel foil. The second electrode plate 122 may include a second electrode uncoated portion 122a to which the second electrode active metal is not applied. The second electrode uncoated portion 122a may function as a current flow passageway between the second electrode plate 122 and the outside of the second electrode plate 122. A suitable material may be used to form the second electrode plate 122.

The separator 123 may be located between the first electrode plate 121 and the second electrode plate 122 to prevent a short circuit and allow movement of lithium ions. The separator 123 may be formed of a polyethylene film, a polypropylene film, or a film including polyethylene and polypropylene. A suitable material may be used to form the separator 123.

The first terminal assembly 130 and the second terminal assembly 140 may be coupled to the first electrode plate 121 and the second electrode plate 122 at opposite ends of the electrode assembly 120, respectively The electrode assembly 120 may be accommodated in the case 110 together with electrolyte. The electrolyte may include an organic solvent such as ethylene carbonate (EC), propylene carbonate (PC), diethyl carbonate (DEC), ethyl methyl carbonate (EMC), and dimethyl carbonate (DMC), and a lithium salt such as $LiPF_6$ or $LiBF_4$. The electrolyte may be liquid, solid, or gel.

The first terminal assembly 130 may be formed of a metal or an equivalent thereof. The first terminal assembly 130 may be electrically connected to the first electrode plate 121. The first terminal assembly 130 may include a first collecting plate 131, a first upper insulation member 132, a first sealing member 133, a first lower insulation member 134, and a first terminal plate 136. A first gasket 135 may further be formed within the first lower insulation member 134.

The first collecting plate 131 may contact the first electrode uncoated portion 121a protruding from one side of the electrode assembly 120. The first collecting plate 121 may be coupled to the first electrode uncoated portion 121a by welding. The first collecting plate 131 may be made of aluminum or an aluminum alloy, as examples. The first collecting plate 131 may include a vertical part 131a formed along the first electrode uncoated portion 121a, a horizontal part 131b formed at an angle of approximately 90 degrees with respect to the vertical part 131a, a protruding part 131c upwardly protruding at an angle of approximately 90 degrees from the horizontal part 131b through a first terminal hole 150a in the cap plate 150, and a riveting part 131d formed at an end of the protruding part 131c. The riveting part 131d may be riveted to a top surface of the first terminal plate 136, and a welding part 131e may further be formed along the periphery of the riveting part 131d, thereby increasing a coupling force.

The first upper insulation member 132 may be configured to include a penetration hole 132a formed therein to allow the protruding part 131c of the first collecting plate 131 to pass therethrough. The first upper insulation member 132 may be formed between the first terminal plate 136 and the cap plate 150. The first upper insulation member 132 may insulate the first collecting plate 131 and the first terminal plate 136 from the cap plate 150 so as to be electrically isolated from each other. The first upper insulation member 132 may include a first sealing groove 132b on its bottom surface in contact with the cap plate 150 and a second sealing groove 132c on its top surface in contact with the first terminal plate 136. The first sealing groove 132b and the second sealing groove 132c may be spaced apart from a penetration hole 132a of the first upper insulation member 132, through which the first collecting plate 131 passes, and may be formed along the periphery of the first insulation member 132. The first sealing groove 132b and the second sealing groove 132c may be seamlessly, continuously formed along the contour of the penetration hole 132a and may form a region to allow the sealing member 133 to be placed and coupled in a subsequent process. The sealing member 133 may be coupled to the sealing grooves 132b and 132c of the first upper insulation member 132. Accordingly, internal regions of the sealing grooves 132b and 132c may be sealed, thereby preventing moisture from penetrating into the secondary battery 100 through the penetration hole 132a.

The first sealing member 133 may be coupled to the inside of the first upper insulation member 132. Two first sealing members 133 may be provided and inserted into the first sealing groove 132a and the second sealing groove 132b to then be coupled in the form of an O-ring.

The first sealing member 133 may include a lower sealing member 133b adhered to the first sealing groove 132b formed on a bottom surface of the first upper insulation member 132 through an adhesion member 133a, and an upper sealing member 133d adhered to the second sealing groove 132c formed on a top surface of the first upper insulation member 132 through an adhesion member 133c.

The lower sealing member 133b and the upper sealing member 133d may be formed of at least one selected from the group of foamed sponge, ethylene propylene diene M-class (EPDM) rubber, acrylic rubber, silicone rubber, elastomer, thermoplastic elastomer (TC), thermoplastic urethane (TPU), a rubber-like material and a polymer plastic.

The first sealing member 133, including the lower and upper sealing members 133b and 133d, may be coupled to the first upper insulation member 132 while pressing the first terminal plate 136 disposed on the first upper insulation member 132 and the cap plate 150 disposed under the first upper insulation member 132.

Referring to FIG. 3, a moisture penetration path, indicated by an arrow, may be established along the boundary of the first upper insulation member 133. The first sealing member 133, including the lower and upper sealing members 133b and 133d, in the form of an O-ring with respect to the boundary of the first upper insulation member 133, may block moisture, thereby preventing the moisture from penetrating into the secondary battery 100 through the penetration hole 132a. Corrosion or electrical shorts that could occur in the secondary battery 100 due to the moisture may be prevented by the first sealing member 133, including the lower and upper sealing members 133b and 133d.

Figure 4A:
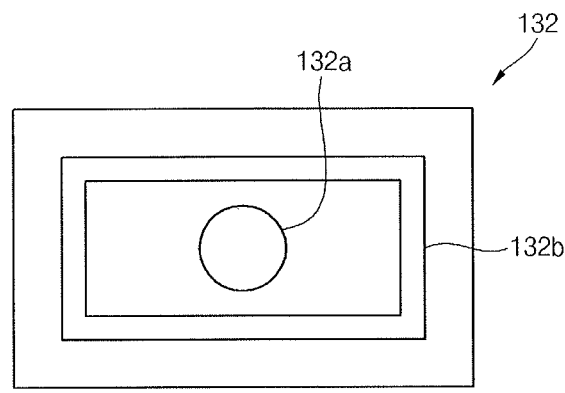
FIG. 4A illustrates a rear view depicting an insulation member of the secondary battery shown in FIG. 1.
Figure 4B:
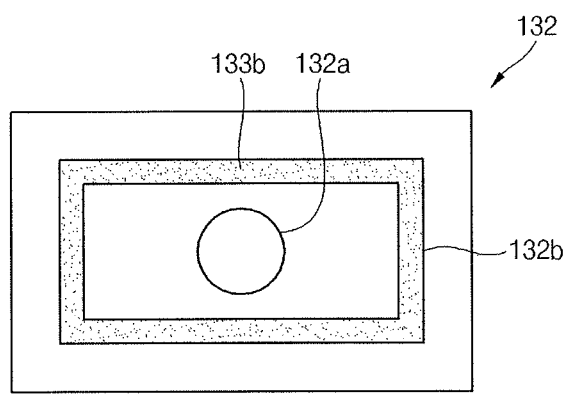
FIG. 4B illustrates a rear view depicting a state in which a sealing member is coupled to a bottom surface of the insulation member shown in FIG. 4A.
Figure 5A:
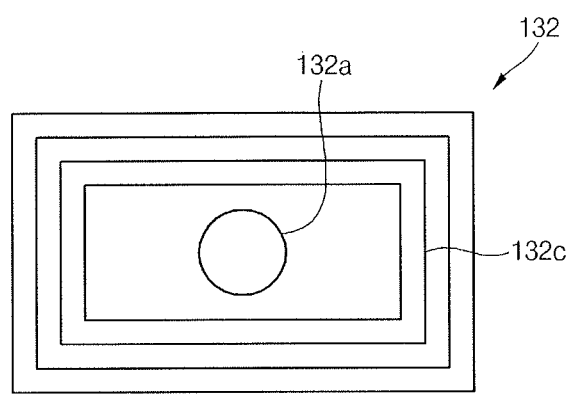
FIG. 5A illustrates a plan view depicting an insulation member of the secondary battery shown in FIG. 1.
Figure 5B:
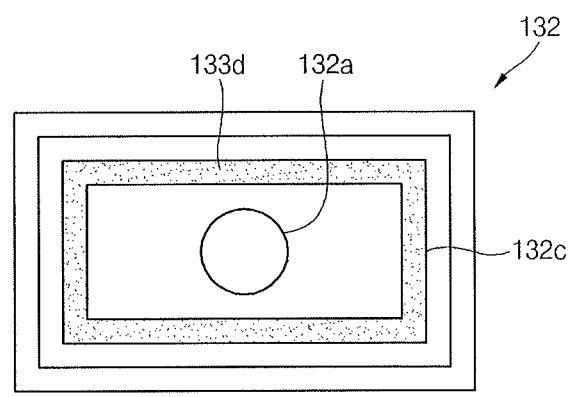
FIG. 5B illustrates a rear view depicting a state in which a sealing member is coupled to a top surface of the insulation member shown in FIG. 5A.
Figure 6A:
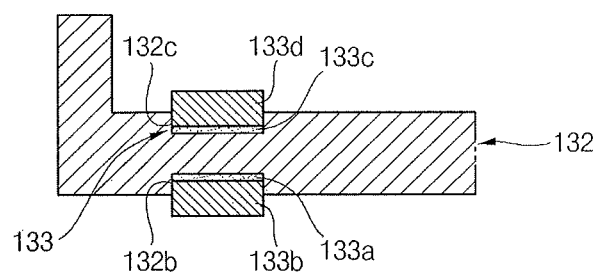
FIG. 6A illustrates a cross-sectional view depicting a procedure in which a sealing member is coupled to an insulation member of the secondary battery shown in FIG. 1.
Figure 6B:
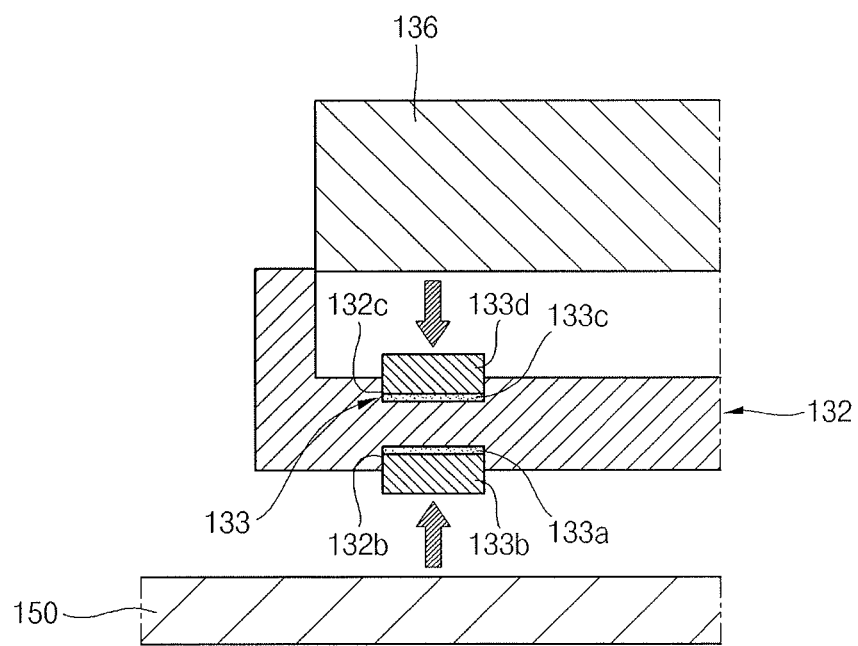
FIG. 6B illustrates a cross-sectional view depicting a procedure in which a cap plate and a terminal plate are coupled to the insulation member shown in FIG. 6A.

FIG. 4A illustrates a rear view depicting an insulation member of the secondary battery shown in FIG. 1, and FIG. 4B illustrates a rear view depicting a state in which a sealing member is coupled to a bottom surface of the insulation member shown in FIG. 4A. FIG. 5A illustrates a plan view depicting an insulation member of the secondary battery shown in FIG. 1, and FIG. 5B illustrates a rear view depicting a state in which a sealing member is coupled to a top surface of the insulation member shown in FIG. 5A. FIG. 6A illustrates a cross-sectional view depicting a procedure by which a sealing member may be coupled to an insulation member of the secondary battery shown in FIG. 1, and FIG. 6B illustrates a cross-sectional view depicting a procedure by which a cap plate and a terminal plate are coupled to the insulation member shown in FIG. 6A.

Referring to FIGS. 4 to 5B and 6A, the first sealing member 133, including the lower and upper sealing members 133b and 133d, are first adhered to the first and second sealing grooves 132b and 132c of the first upper insulation member 133 through the adhesion members 133a and 133c. In such a state, as shown in FIG. 6B, the first sealing member 133, including the lower and upper sealing members 133b and 133d, are compressed by being coupled to the first upper insulation member 132 while pressing the cap plate 150 from a lower portion of the first upper insulation member 132 and the first terminal plate 136 from an upper lower portion of the first upper insulation member 132. Therefore, the first sealing member 133, including the lower and upper sealing members 133b and 133d, may have elastic resilience. Interfaces between the first upper insulation member 132 and the cap plate 150 and between the first upper insulation member 132 and the first terminal plate 136 may be hermetically sealed using the resilience, thereby preventing moisture from penetrating into the secondary battery 100.

The first lower insulation member 134 may be formed to make close contact between the horizontal part 131b of the first collecting plate 131 and the cap plate 150. The first lower insulation member 134 may prevent electrolyte from leaking through the first collecting plate 131 and the cap plate 150 and may electrically isolate the cap plate 150 from the first collecting plate 131.

The first gasket 135 may be formed to make close contact between the protruding part 131c of the first collecting plate 131 and the cap plate 150. The first gasket 135 may effectively prevent electrolyte from leaking. In some implementations, the first gasket 135 may be integrally formed with the first lower insulation member 134 according to the configuration of the first lower insulation member 134.

The first terminal plate 136 may be made of aluminum or an aluminum alloy. The first terminal plate 136 may have a terminal body and an inclined surface recessed from a top portion of the terminal body. When the riveting part 131d of the first collecting plate 131 is riveted, the riveting part 131 may be easily compressed along the inclined surface to then be transformed, thereby increasing a coupling area from a surface contact with the riveting part 131d. In addition, the welding part 131e may be further formed at an end at which the first terminal plate 136 makes contact with the riveting part 131d of the first collecting plate 131, thereby increasing a coupling force. Accordingly, the first terminal plate 136 may be mechanically and electrically connected to the first collecting plate 131.

The second terminal assembly 140 may have the same configuration as the first terminal assembly 130 and may be formed to correspond to the first terminal assembly 130. The second terminal assembly 140 may include a second collecting plate 141, a second upper insulation member 142, a second sealing member 143, a second lower insulation member 144, a second gasket 145, and a second terminal plate 146. For example, the second collecting plate 141 may contact a second electrode uncoated portion 122a and may include a vertical part 141a, a horizontal part 141b, a protruding part 141c protruding through a second terminal hole 150b in the cap plate 150, a riveting part 141d, and a welding part 141e. The various components of the second terminal assembly 140 may have the same or similar structure as corresponding components of the first terminal assembly 130. Accordingly, detailed descriptions thereof will not be repeated.

The cap plate 150 may seal an opening of the case 110 and may be made of the same material as the case 110. The cap plate 150 may be coupled to the case 110 by laser welding.

The cap plate 150 may include a safety vent 151 formed at a roughly central area to have a smaller thickness than other areas. When the internal pressure of the cap plate 150 is increased due to an over-charge, the safety vent 151 may be opened earlier than other areas, thereby preventing the secondary battery 100 from exploding.

In addition, the cap plate 150 may further include a plug 152 formed along an electrolyte injection hole. Once the electrolyte is injected into the case 110, the plug 152 may prevent the electrolyte from leaking to the outside.

Hereinafter, a configuration of a secondary battery according to another embodiment will be described.

Figure 7A:
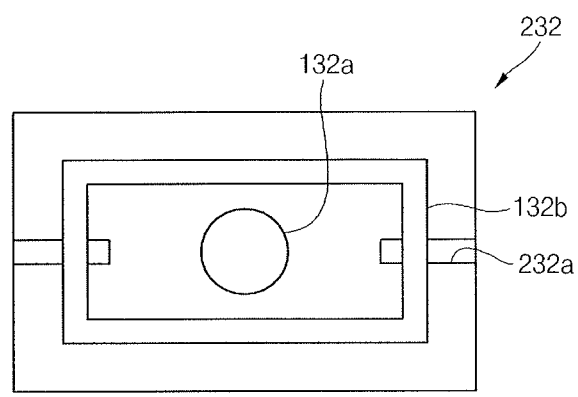
FIG. 7A illustrates a rear view of an insulation member of a secondary battery according to another embodiment.
Figure 7B:
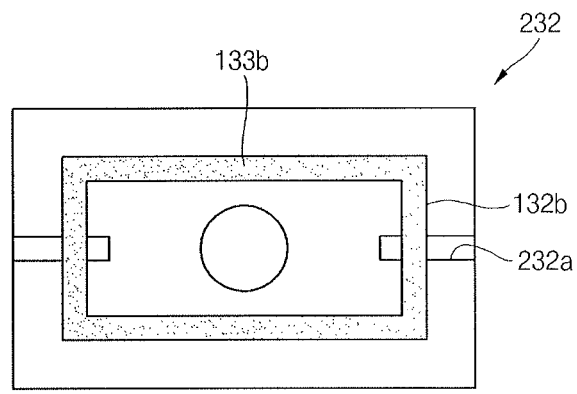
FIG. 7B illustrates a rear view depicting a state in which a sealing member is coupled to a bottom surface of the insulation member shown in FIG. 7A.
Figure 8:
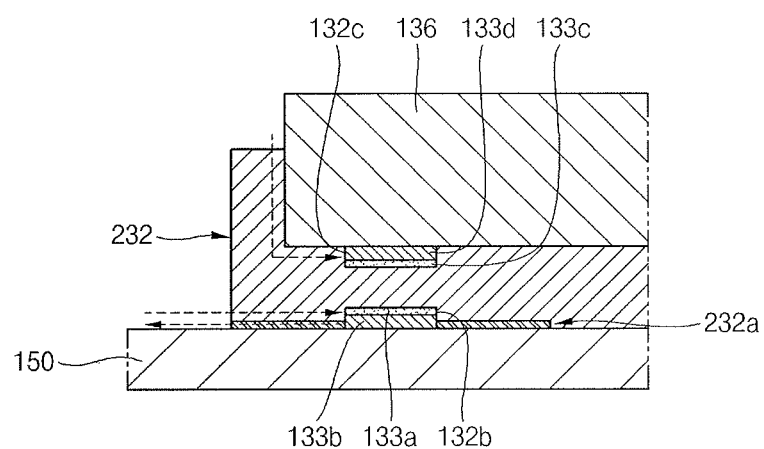
FIG. 8 illustrates a cross-sectional view illustrating a structure in which a cap plate and a terminal are coupled to an insulation member in the secondary battery shown in FIG. 7A.

FIG. 7A illustrates a rear view of an insulation member of a secondary battery according to another embodiment, and FIG. 7B illustrates a rear view depicting a state in which a sealing member is coupled to a bottom surface of the insulation member shown in FIG. 7A. FIG. 8 illustrates a cross-sectional view illustrating a structure in which a cap plate and a terminal are coupled to an insulation member in the secondary battery shown in FIG. 7A.

Referring to FIGS. 7A to 8, the secondary battery according to another embodiment includes a case, an electrode assembly, a first terminal assembly, a second terminal assembly, and a cap plate 150. In the illustrated embodiment, components having the same configuration and function as those of the previous embodiment are denoted by the same reference numerals, and the following description will focus on differences between the present and previous embodiments. In addition, the case, electrode assembly, first terminal assembly, and second terminal assembly, not shown in FIGS. 7A, 7B and 8, may have the same configuration as the case 110, electrode assembly 120, first terminal assembly 130, and second terminal assembly 130 depicted with respect to the previous embodiment.

The first terminal assembly may be made of a metal or an equivalent thereof and may be electrically connected to a first electrode plate of an electrode assembly. The second terminal assembly may include a second collecting plate, a second upper insulation member 232, and a second sealing member 133b, 133d.

The first upper insulation member 232 may further include a ventilation groove 232a formed on its bottom surface. The ventilation groove 232a may be inwardly formed in a direction perpendicular to the bottom surface of the first upper insulation member 232. The ventilation groove 232a may be inwardly formed in a horizontal direction from an edge of the first upper insulation member 232.

In a case where an inversion plate that is inverted when a pressure of a case exceeds a predetermined level is provided in the first terminal assembly or the second terminal assembly, the ventilation groove 232a may maintain the internal pressure of the case at a constant level. For example, the first terminal assembly, the case and the cap plate may be formed to have the same polarity with a first electrode, e.g., a polarity of a positive electrode, and the inversion plate may be connected thereto. Then, if the inversion plate is inverted according to the internal pressure, the first terminal assembly may be brought into contact with the second terminal assembly having a polarity of a second electrode, thereby causing an electric short.

In the illustrated embodiment, it is desirable that the second terminal assembly spaced apart from the inversion plate be maintained at a constant pressure during a normal operation of the secondary battery.

Therefore, in the secondary battery according to this embodiment, ventilation is performed using the ventilation groove 232a and the second sealing member 133b, 133d, thereby allowing the first terminal assembly 130 or the second terminal assembly 140 to maintain a constant pressure. In this case, moisture may be prevented from penetrating into the secondary battery by the second sealing member 133b, 133d foamed in the first upper insulation member 232. The second sealing member 133b, 133d may perform ventilation and may be made of foamed sponge so as to prevent the moisture from penetrating into the secondary battery.

By way of summation and review, embodiments provide a secondary battery that can prevent or reduce the likelihood of moisture from penetrating into the battery cell. In the secondary battery, a sealing groove may be formed in an upper insulation member between a cap plate and a terminal plate, and a sealing member including a foamed sponge, rubber or polymer plastic in the form of an O-ring may be formed in the sealing groove, thereby preventing or reducing the likelihood of external moisture from penetrating into the secondary battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A secondary battery, comprising:
   a case including an accommodating space therein;
   an electrode assembly in the accommodating space of the case;
   a cap plate sealing the case;
   a collecting plate including a first portion, the first portion passing through the cap plate and being electrically connected to the electrode assembly;
   a terminal plate coupled to the first portion of the collecting plate;
   an insulation member between the cap plate and the terminal plate in a first direction; and
   a sealing member on at least one surface of the insulation member, wherein
   at least one portion of the insulation member is between the sealing member and the first portion of the collecting plate in a second direction perpendicular to the first direction.

2. The secondary battery as claimed in claim 1, wherein the sealing member is in a form of an O-ring located along a periphery of the first portion of the collecting plate.

3. The secondary battery as claimed in claim 1, wherein:
   the insulation member includes a penetration hole through which the collecting plate passes, and
   the sealing member surrounds the periphery of the penetration hole.

4. The secondary battery as claimed in claim 3, wherein the sealing member is continuously formed along the periphery of the penetration hole.

5. The secondary battery as claimed in claim 1, wherein the insulation member includes a sealing groove at a region corresponding to the sealing member, the sealing groove accommodating the sealing member.

6. The secondary battery as claimed in claim 1, wherein the sealing member is adhered to the insulation member by an adhesion member and presses the cap plate and the terminal plate.

7. The secondary battery as claimed in claim 1, wherein the sealing member includes at least one selected from the group of foamed sponge, ethylene propylene diene rubber, acrylic rubber, silicone rubber, an elastomer, a thermoplastic elastomer, a thermoplastic urethane, a rubber-like material, and a polymer plastic.

8. The secondary battery as claimed in claim 1, wherein the sealing member protrudes relative to the insulation member in a state prior to the cap plate and terminal plate being coupled to each other, and is compressed in a state that the cap plate and the terminal plate are coupled thereto.

9. The secondary battery as claimed in claim 1, wherein;
the sealing member is on a surface on which the insulation member makes contact with the cap plate, and
the insulation member further includes a ventilation groove on the surface, the ventilation groove overlapping the sealing member.

10. The secondary battery as claimed in claim 9, wherein:
one end of the ventilation groove is positioned within the periphery of the sealing member, and
another end of the ventilation groove extends to the exterior of the periphery of the sealing member.

11. The secondary battery as claimed in claim 10, wherein the other end of the ventilation groove extends to an exterior edge of the insulation member.

12. The secondary battery as claimed in claim 9, wherein the sealing member is a foamed sponge.

* * * * *